United States Patent [19]

Striek et al.

[11] Patent Number: 5,256,905
[45] Date of Patent: Oct. 26, 1993

[54] METHOD AND CIRCUIT FOR SEQUENTIALLY CONNECTING PLURAL LOADS TO AN A.C. VOLTAGE WITHOUT DAMAGING THE LOW VOLTAGE CONTROL CIRCUITRY THEREFOR

[75] Inventors: Ralf-Jürgen Striek; Peter Müller, both of Berlin, Fed. Rep. of Germany

[73] Assignees: The Coca-Cola Company, Atlanta, Ga.; Bosch-Siemens Hausgerate GmbH, Fed. Rep. of Germany

[21] Appl. No.: 631,976

[22] Filed: Dec. 21, 1990

[30] Foreign Application Priority Data

Dec. 22, 1989 [DE] Fed. Rep. of Germany ....... 3942710

[51] Int. Cl.$^5$ ............................................. H02P 3/18
[52] U.S. Cl. ...................................... 307/34; 318/599; 307/31
[58] Field of Search ..................... 307/31, 33, 34, 35, 307/38–41, 567, 240, 242, 247.1, 632, 633, 645, 596, 296.3, 115, 141.4; 323/225, 272, 908; 318/599, 812; 363/37, 135–139

[56] References Cited

U.S. PATENT DOCUMENTS

| | | | |
|---|---|---|---|
| 3,740,585 | 6/1973 | Squiers | 307/252 B |
| 3,940,669 | 2/1976 | Tsuboi et al. | 318/227 |
| 3,980,943 | 9/1976 | Cailleux et al. | 323/225 C |
| 4,300,077 | 11/1981 | Katz et al. | 318/812 |
| 4,511,836 | 4/1985 | Eriksson | 323/300 |
| 4,585,983 | 4/1986 | Cooper et al. | 318/723 |
| 4,683,415 | 7/1987 | Zimmerman | 323/282 |
| 4,689,548 | 8/1987 | Mechlenburg | 323/243 |
| 4,736,148 | 4/1988 | Hirata | 318/812 |

*Primary Examiner*—Jeffrey A. Gaffin
*Assistant Examiner*—Aditya Krishnan

[57] ABSTRACT

In an appliance having a relatively low voltage control section controlling one or more AC power loads through switch devices such as triacs, the triacs are gated sequentially within each half cycle such that the peak load on the low voltage control circuitry caused by gating the plural triacs is equal to the load created by gating only a single triac. Distribution of the gating of plural triacs is accomplished through the use of a timing circuit or microprocessor, or RC timing circuits having differing time constants.

20 Claims, 4 Drawing Sheets

METHOD AND CIRCUIT FOR SEQUENTIALLY CONNECTING PLURAL LOADS TO AN A.C. VOLTAGE WITHOUT DAMAGING THE LOW VOLTAGE CONTROL CIRCUITRY THEREFOR

FIELD OF THE INVENTION

The present invention is directed to an improvement in the method of gating plural load switching devices and the circuit for performing this method. More particularly, the present invention is directed to the gating of plural triacs upon a single command without damaging low-voltage control circuitry.

It is desirable for control circuitry designed for use in domestic appliances to be reliable and inexpensive. Power triacs in such circuits are conventionally gated by a selective timer. This gating of the power triacs is normally performed under control of a logic circuit responsive to input sensors or the like connected thereto. Typically, such a control circuit is constructed using a microprocessor or microprocessor circuit. On occasion, there is a request to gate several triacs simultaneously at a particular point of a selective control program. A problem arises, however, when triacs are to be gated simultaneously in such control circuits. Specifically, there is a risk that the load developed by the attempt to simultaneously gate more than one triac is too great for the microprocessor or associated microprocessor buffer circuitry components. Thus, damage to the control circuitry may result.

Alternatively, it is possible to design the control circuitry to utilize specific low-voltage buffer circuit components within the channel driver of sufficient size to avoid overload of such control circuitry. While such enhanced control circuitry can avoid the overload problem, the inclusion of such circuitry increases circuit cost.

There are two basic conventional processes for gating triacs. These are known as the so called "static" and "dynamic" address modes, the "dynamic" address mode being also known as "pulse control". Pulse control is generally desirable as less energy is needed to pulse drive AC circuits. However, zero crossing information must be available in such a pulse drive system to prevent supply of the gating signal to the triac too soon or too late in time with respect to a zero crossing, thereby causing gating failure. In gating triacs using such a dynamic address mode, the current phase shift caused by capacitive or inductive load related phase lead or lag must be considered to prevent the gating signal from falling below the triac holding current.

When several triacs are used in a single system, the sum of the ignition currents which are simultaneously supplied to the gates of the triacs must be considered in determining the peak load of the low-voltage section of the circuitry. Thus, if three triacs are simultaneously gated, the peak load to the low-voltage section of the circuitry is three times the load necessary to gate a single triac. Accordingly, the present invention seeks to reduce this peak load to the low-voltage section of the circuitry to prevent overload thereof.

OBJECTS OF THE INVENTION

It is an object of the present invention to provide efficient and low cost gating of plural triacs.

It is another object of the present invention to provide such efficient and economic gating of plural triacs through reducing the load to the low-voltage gating signal supply circuitry.

It is another object of the present invention to perform the above mentioned objects by preventing simultaneous gating of plural triacs.

It is still another object of the present invention to provide for the sequential gating of plural triacs so as to reduce the peak load as seen by the low-voltage section of the control circuitry, thereby allowing simple and inexpensive circuitry construction.

It is a further object of the present invention to perform the above mentioned objects in a domestic appliance or the like.

It is a still further object of the present invention to produce an economical triac gating circuit, by ensuring sequential gating of the plural triacs, so as to reduce the load current seen by the low-voltage circuitry, thereby reducing circuit complexity and cost.

SUMMARY OF THE INVENTION

The above mentioned objects of the present invention are accomplished by virtue of the novel method according to the teachings of the present invention in which a switching command requesting simultaneous switching of more than one triac causes the drive circuitry to develop a series of ignition pulses which gate the triacs sequentially in such a way that the electrical load of the low-voltage components used for gating the triacs corresponds to the ignition load of only a single triac. The triacs are gated in closely following sequence within a single AC half-wave in such a way that the electrical load of the low-voltage components gating the triacs is no greater than the ignition load of a single triac. The offset of the individual ignition pulses under switching command is performed automatically after each detected zero crossing of the AC wave-form. Since the individual ignition pulses therefore occur immediately after the zero crossing is detected, the ignition pulse series may be repeated as often as necessary or desirable within the AC half-wave.

The switching circuit for dynamic gating of plural triacs initially obtains the AC waveform zero crossing point. The switching circuit comprises a balance-pulse shaper which may be constructed as part of the microprocessor. A logic circuit is connected to the zero crossing detector and operates in conjunction with the balance and pulse shaper. Desirably the balance and pulse shaper operates in cooperation with a delay circuit. This delay circuit serves to offset ignition pulses with respect to current flow in the event a current lag exists due to an inductive load or a current lead exists due to a capacitive load (Cosine $\theta$).

A calculator and an interrogator operate in cooperation with the balance and pulse shaper. The interrogator or multiplexer is generally connected in series with the balance and pulse shaper and preferably includes a multiplex key switching unit. The balance and pulse shaper is electrically connected to an n-channel driver for gating the triacs. A gate circuit, which can be located within the central processing unit, is activated by the interrogator and switches through the channel driver only those gating pulses directed to triacs which have been selected through the commands entered by the multiple key switching unit. In essence, therefore, the multiple key switching unit selects, t least indirectly, the loads to be energized by the circuitry of the present invention.

The balance-pulse shaper, logic circuit, calculator and delay circuit may be formed of a single chip microprocessor or other single central circuit unit, if desired.

From the foregoing it is apparent that the serial gating of plural triacs provides almost simultaneous gating of the triac connected to the gate circuit, but avoids increase in the current load on the low-voltage section of the drive circuitry, thus corresponding maximum current load to the load caused by gating of only a single triac. Thus, component overload within the low-voltage section is avoided according to the teachings of the present invention.

BRIEF DESCRIPTION OF THE DRAWINGS

The embodiments of the present invention are illustrated in the attached drawings wherein.

DETAILED DESCRIPTION OF THE PREFERRED EMBODIMENTS

Figure 1:
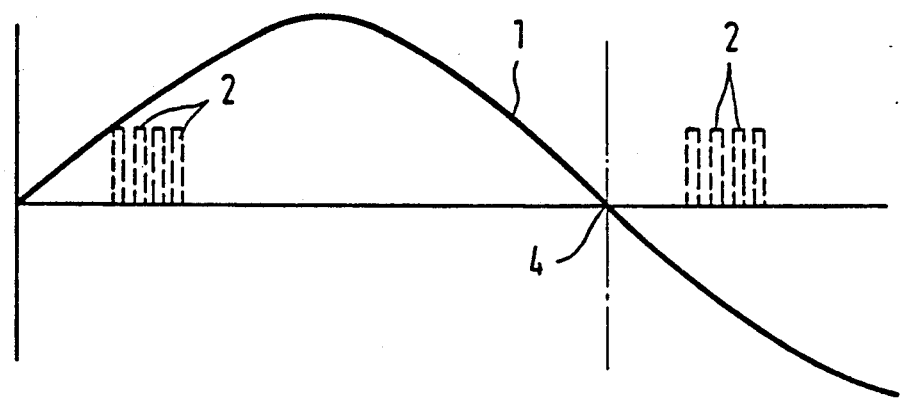
FIG. 1 is a voltage diagram illustrating the relationship between the serial gating pulses 2 and the AC controlled waveform 1.

FIG. 1 diagrammatically illustrates the AC controlled voltage 1 and its relationship to a gating pulse series 2 produced in accordance with the teachings of the present invention. A zero crossing point 4 of the AC controlled voltage 1 is further illustrated.

Figure 2:
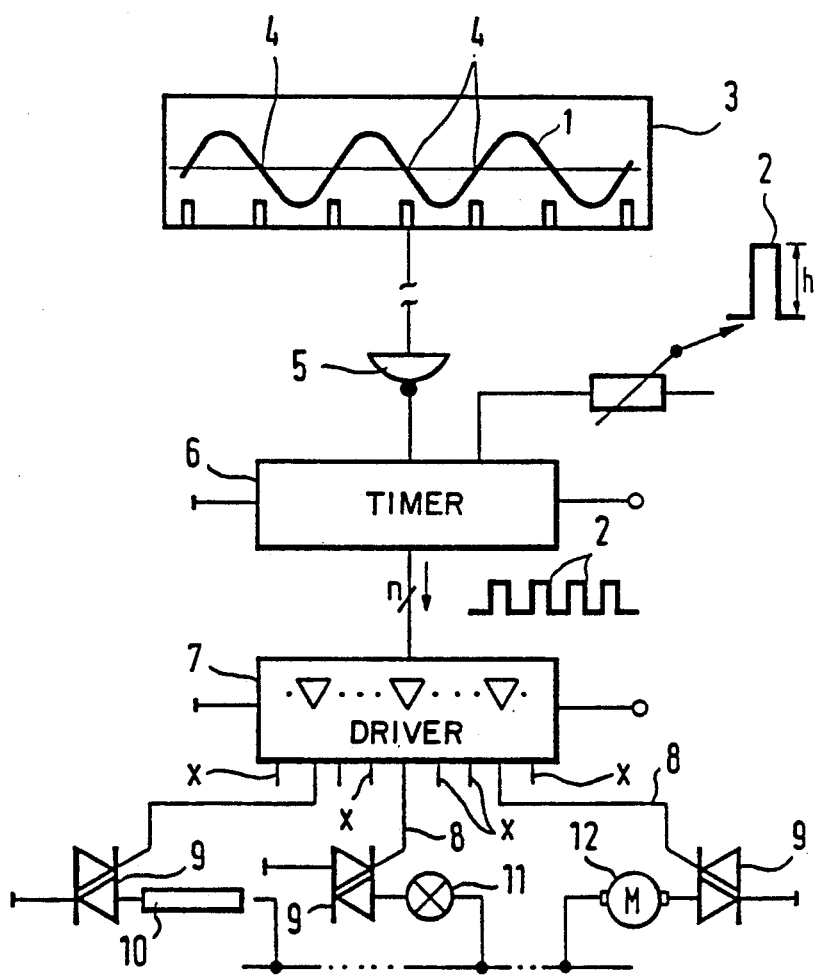
FIG. 2 is a schematic representation of a circuit for sequentially gating plural triacs according to the teachings of the present invention.

Should an apparatus contain several triacs to be gated through one or more switching commands, the triacs 9 of FIG. 2 are gated by the gating pulse series 2. Each individual triac 9 is gated with a different one of the individual gating pulses of the gating pulse series 2. This gating pulse series 2 can be repeated as often as desired within the positive half-wave. By means of a control device as illustrated in FIG. 2, the triacs 9 are gated with an offset or time delay with respect to each other caused by the pulses in the gating pulse series 2 in such a way that the peak load seen by the low-voltage control circuitry corresponds to the maximum value of the highest gating load for a single triac only. In this way, a potentially damaging peak load which might otherwise be caused by simultaneous gating of multiple triacs is avoided.

In FIG. 2, the AC voltage curve 1 is schematically represented in box 3. A zero crossing detector 5 monitors the AC voltage curve and produces a pulse signal to be supplied to a timer or sweep stage 6 upon each zero crossing detection. In the timer 6, among other events, the slope height h of the triac gating pulse is set and the pulse series 2 is developed. Pulses output from the timer 6 are provided to an n-channel driver 7 which amplifies the pulses and provides them to a plurality of outputs 8 each of which correspond to an individual power triac 9. The n-channel driver 7 is also provided with additional outputs x for additional power triacs which are not shown in this example. It is apparent that the circuit of the present invention may control a number of plural triacs as necessary. Each power triac 9 switches a desired load. In the embodiment of FIG. 2, such loads include a heater 10, a lamp 11 or a motor 12. However, any suitably sized AC driven component can also be switched by a triac 9.

Figure 3:
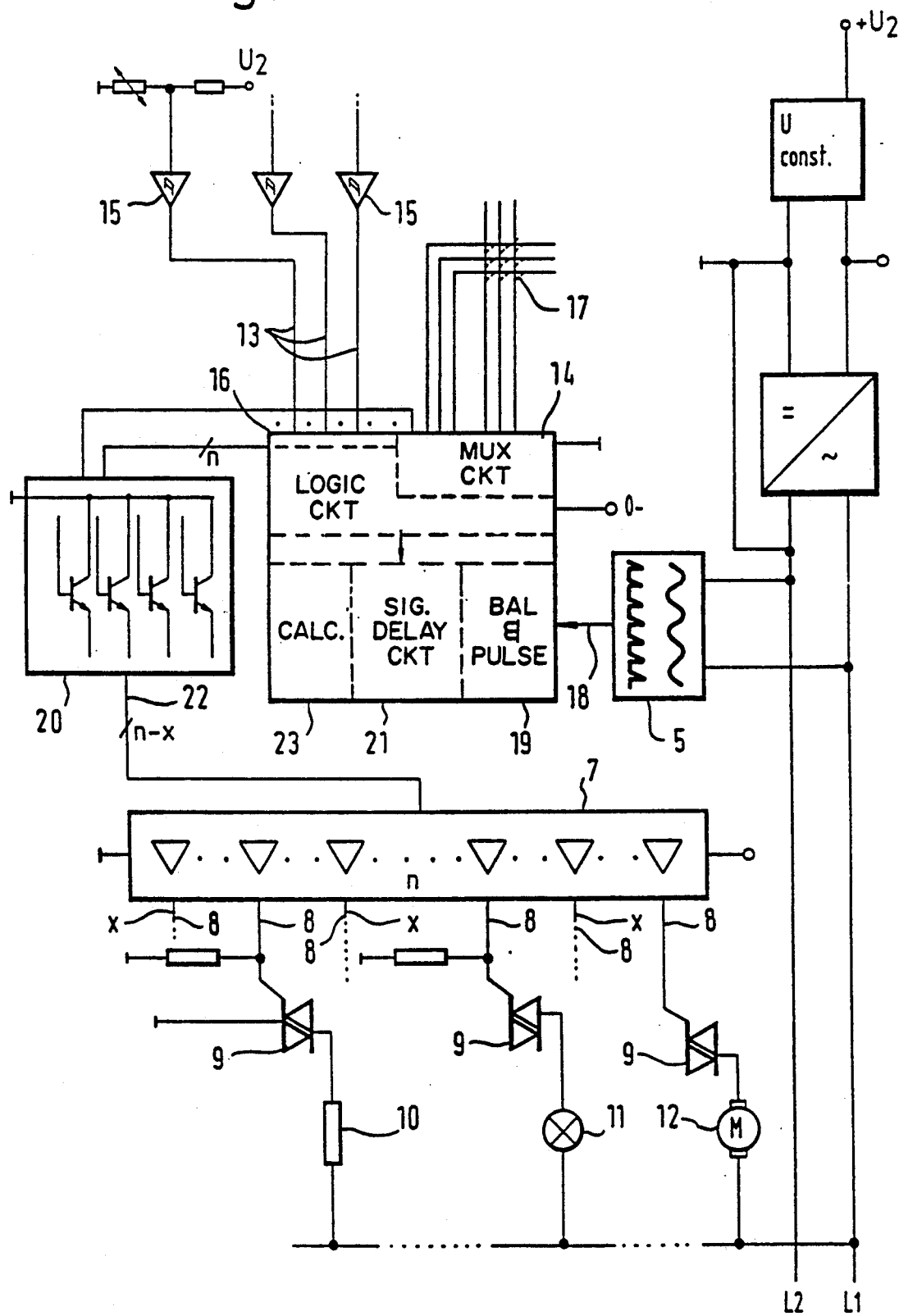
FIG. 3 is an alternative and more detailed embodiment of the a circuit for sequentially gating plural triacs according to the teachings of the present invention, particularly disclosing alternative detail to the timer 6 of FIG. 2.

FIG. 3 illustrates an embodiment of the present invention wherein the timer or sweep stage 6 is replaced by a central processing unit 14 in which a number of switching functions are performed. The central processing unit is preferably constructed of a microprocessor provided information from sensors 15 via associated signal conductors 13. The sensor signals may be provided to a logic circuit or programmable interconnection portion 16 of the central processing unit 14.

An interrogator or multiplex circuit 17 utilizes a plurality of switches; a portion thereof is illustrated in detail on FIG. 3A. This interrogator or multiplex circuit 17 is likewise implemented under program control by the central processing unit 14. In the embodiment of FIG. 3, the AC voltage zero crossing point is obtained from the detector 5 which develops a detector output 18 which is provided to a balance and pulse shaper 19 within the central processing unit 14.

The central processing unit 14 is connected with a gate circuit 20. Gating pulse series 2 provided by the central processing unit are provided to the gate circuit 20. The gate circuit 20 provides gating pulses of the gating pulse series 2 via signal conductor 22 to the n-channel driver 7 to only those triacs that are to be gated under control of the program selected by the switches of the interrogator 17. All other gating pulses are suppressed due to non-conduction of the respective transistors associated therewith. For example, the gating pulses associated with the outputs 8x of the n-channel driver circuit 7 of this figure would correspond to transistors of the gate circuit 20 which are not selected the central processing unit 14.

In FIG. 3, in the same manner as in FIG. 2, the outputs x of the n-channel driver 7 are associated with the gates of triacs 9 (not shown) which are not required by the program selected by the interrogator 17. The gating pulses to be otherwise provided to these non-selected triacs associated with the outputs 8x of the n-channel driver 7 are therefore suppressed. The n-channel driver 7 is located within the load-voltage DC circuitry. Once again, if the gating pulses produced by multiple channels of the n-channel driver 7 were simultaneously produced to simultaneously gate more than one triac, an overload may occur, thereby damaging this low-voltage components. Since damage of the low-voltage components should be avoided, it is desirable to gate the triacs serially according to the teachings of the present invention. The triacs are therefore serially gated one after another so that the electrical gating load corresponds to that of only one individual triac.

By the sequential gating of triacs according to the teachings of the present invention, overload is prevented thus preventing ensuing damage to the switching components in the n-channel driver 7 or the central processing unit 14. The central processing unit 14 preferably also contains a signal delay circuit 21 which serves to adjust the timing of the gating pulse series 2 to compensate for current lead or lag caused by inductive or compositive loading, thereby ensuring that the triacs are properly ignited. A calculator 23, provided within the central processing unit 14, coordinates the individual commands with the sensor signals provided by the sensors 15 and the start signals delivered by the zero crossing detector 5. The calculator 23 also calculates pulse slope height and the moment of release of the gating pulse series 2 after completion of zero crossing of the positive AC half-wave to ensure proper conduction of the triacs.

Figure 4:
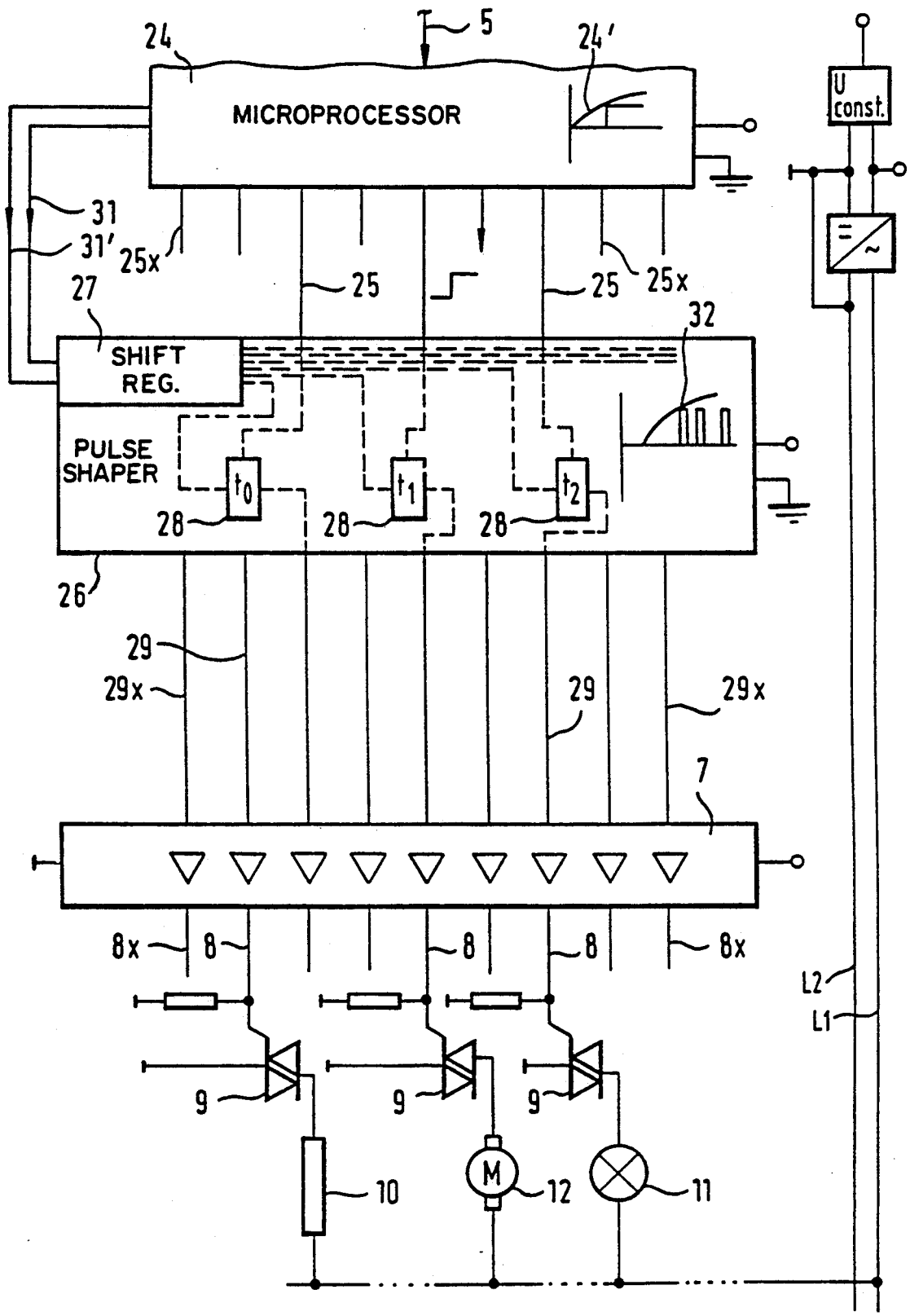
FIG. 4 illustrates an alternative embodiment of the a circuit for sequentially gating plural triacs according to the teachings of the present invention, and is generally commensurate in scope with FIG. 3.

FIG. 4 provides a schematic representation of an alternative to the circuit of FIG. 3. After the AC zero crossing point has been detected by the zero-crossing detector 5, a gating signal is provided to a microprocessor 24. The operation of the microprocessor 24 in FIG. 4 generally corresponds to the operation of the logic and multiplex interrogator sections 16, 17 respectively of the central processing unit 14 of FIG. 3. The microprocessor 24 supplies a uniform start pulse 24'. The start pulse 24' is provided via signal connectors 25 and 25' to a plurality of timing units 28 in a pulse shaper 26. Each timing unit 28 corresponds to an individual pulse of the gating pulse series 2 and accordingly to individual triacs. The timers 28 are enabled by a calculator or shift register 27 connected via conductors 30 and 30' to the microprocessor 24. The calculator or shift register 27 is enabled under control of the microprocessor 24 and produces a series of pulses as shown at 32 which do not overlap.

The microprocessor 24, shift register 27, and timers 28 are readily available commercial components as would occur to one of ordinary skill in the art. Suitable components for these elements are available in the catalogs of various manufacturers.

According to the teachings of the present invention, it is desirable to time the offset of the individual pulses so that they do not overlap and so that they all occur within one AC half-wave. If necessary, the gating pulse series 2 may be repeated as necessary within this half-wave. The interrogator 17 and the sensors 15 of FIG. 3 would, in the embodiment of FIG. 4 activate the microprocessor 24 and enable only those triacs 9 necessary to carry out the selected program. All other triacs, for example those connected to signal conductors 25x would be disabled. The pulse is emitted from the timer units 28 are fed to the signal conductors 29 and 29x to the n-channel driver 7 to thereby drive the selected triacs in a manner similar to that of FIG. 3.

Figure 5A:
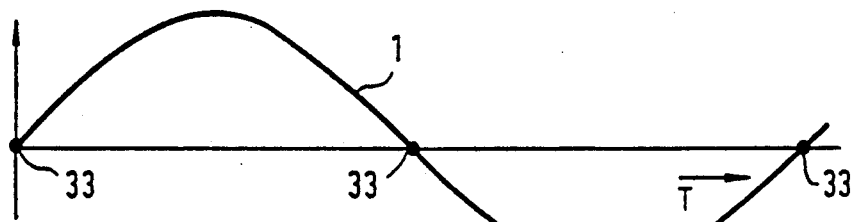
FIGS. 5A-5E show waveforms explaining the additional alternative embodiment of FIG. 6.
Figure 5B:
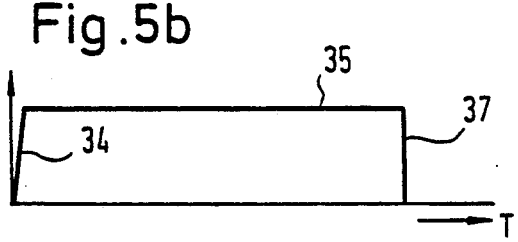
Figure 5C:
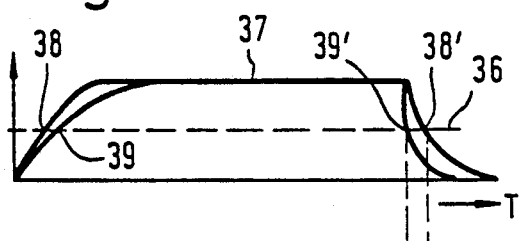
Figure 5D:
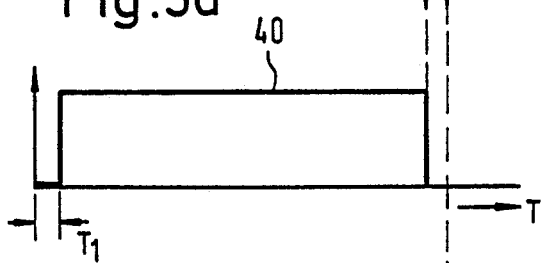
Figure 5E:
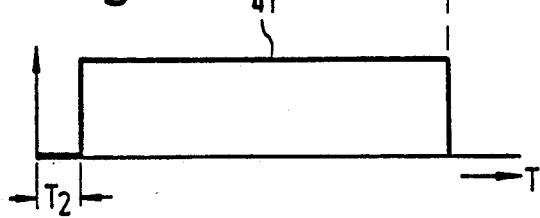
Figure 6:
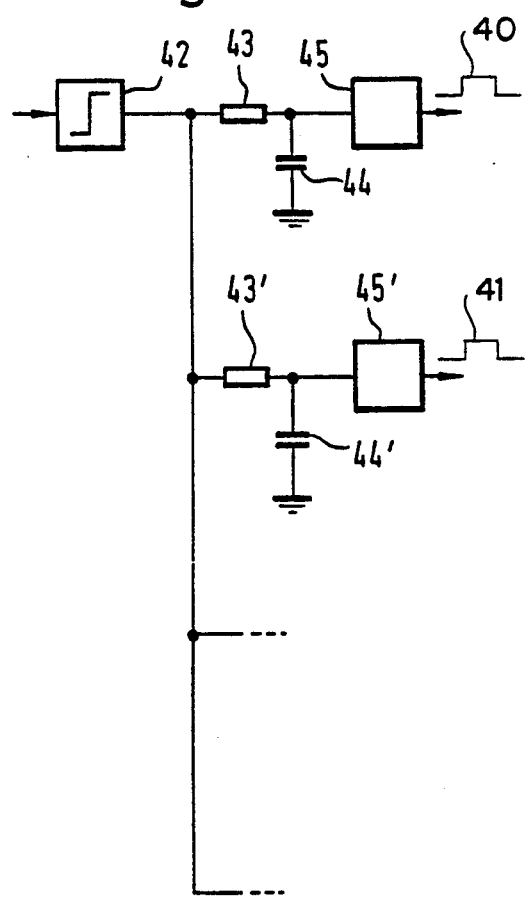
FIG. 6 shows an alternative circuit for gating plural triacs according to the teachings of the present invention.

FIGS. 5 and 6 illustrate an alternative circuit for gating several triacs, which circuit primarily comprises discrete components. According to the teachings of this embodiment of the present invention, the RC time constant of the resistor 43 and capacitor 44 for respective channels associated with respected triacs is varied. At the zero crossing point 33 of the AC drive waveform 1 as illustrated in FIG. 5, a comparator 42 switches on signal 35 as illustrated in FIG. 5(B) which is then supplied to the timing circuit including resistor 43 and capacitor 44. Through the filtering caused by this timing circuit, the ascending and descending slopes of the signal 37 are smoothed as illustrated in FIG. 5(C). A threshold value switch 45, 45' is then utilized to produce the timing signal associated with an individual channel.

Through the use of these of different RC constants, the timing of respective channels is varied so as to vary the timing of the outputs of the respective threshold-value switches 45, 45'. The threshold-value switches 45 may be formed of Schmidt triggers or the like. By virtue of the variation of the RC time constant produced by resistors 43 and capacitors 44, the timing in respective channels is varied, making it possible to ignite the individual triacs and sequence. Thus the outputs 40,41 of the threshold value switches 45, 45' are delayed with respect to each other. The dimension of the time delays $T_1$, $T_2$ are varied through adjustment of the RC constant of the respective resistor and capacitor to ensure that the individual triacs 9 are gated sequentially as illustrated in FIGS. 5(d) and 5(e).

From the forgoing description, it is apparent that the triac gating method and circuitry of the present invention reliably and inexpensively gate plural triacs. From the above mentioned advantages and the descriptions of the preferred embodiments, it is apparent that the concepts set forth in the present application may exhibit a variety of forms. Modifications to the teachings of the present application may be made as would occur to one of ordinary skill in the art without varying from the contributions of the inventors. Accordingly, the scope of the present application should be determined solely by the scope of the appended claims.

What is claimed is:

1. In apparatus including a plurality of discrete loads driven by an A.C. drive voltage switched by plural triac type control devices, a method of controlling the switching of the plural triac type control devices with a low voltage control circuit comprising:
    generating a switching pulse sequence having a plurality of substantially simultaneous yet relatively closely spaced non-overlapping switching pulses within a single A.C. half-wave; and
    switching each triac type control device on individually in coincidence with a respective different switching pulse of said sequence to thereby distribute the switching load of said plural triac type control devices on said low voltage control circuit such that the peak load on said low voltage control circuit does not exceed the peak load caused by switching on a single triac type control device.

2. The method of claim 1 wherein said triac type control devices include control terminals and are switched on by applying respective control signals to the control terminals thereof.

3. The method of claim 2 further comprising:
    detecting the zero crossing points of said A.C. drive voltage; and
    wherein said step of generating comprises generating said switching pulse sequence after a said zero crossing point is detected within each A.C. half-wave.

4. The method of claim 3 wherein said step of generating is repeated a predetermined number of times within each A.C. half-wave.

5. The method of claim 1 wherein said triac type control devices comprise triacs and said plurality of discrete loads comprise a plurality of diverse type loads.

6. In apparatus including a plurality of discrete loads driven by an A.C. drive voltage switched by a plurality of triac type control devices each having a control terminal, a method of controlling the switching of said triac type control devices with a low voltage control circuit comprising the steps of:
    providing a time delay in series with the control terminal of each of said triac type control devices, said time delay associated with each said triac type control device having a different time constant;

generating a plurality of relatively closely spaced non-overlapping switching pulses, one respective pulse for each of said plural triac type control devices which are to be switched on; and sequentially supplying a said respective switching pulse to each said triac type control device to be switched on, the differing time constants of said time delays causing the switching pulse to switch each said triac type control device at a different successive time to thereby distribute the switching load on said low voltage control circuit such that the peak load on said low voltage control circuit does not exceed the peak load caused by switching on a single triac type control device.

7. The method of claim 6 wherein said triac type control devices comprise triacs and said plurality of discrete loads comprise a plurality of diverse type loads.

8. In apparatus including a plurality of discrete loads driven by an A.C. drive voltage switched by plural triac type control devices, a low voltage control circuit for controlling the switching of the plural triac type control devices, the control circuit comprising:

a timer circuit generating a switching pulse sequence having a plurality of substantially simultaneous yet relatively closely spaced non-overlapping switching pulses within a single A.C. half-wave; and logic means for switching each said triac type control device on in coincidence with a different respective switching pulse of said switching pulses to thereby sequentially distribute the switching load on said low voltage control circuit such that the peak load on said low voltage control circuit does not exceed the peak load caused by switching on a single said triac type control device.

9. The control circuit of claim 7 wherein said timer circuit includes balance circuit means and pulse shaper circuit means.

10. The apparatus of claim 8 wherein said triac type control devices comprise triacs and said plurality of discrete loads comprise a plurality of diverse type loads.

11. The control circuit of claim 8 wherein said timer circuit includes a shift register for generating a plurality of sequential enable signals and a plurality of timers, responsive to said shift register, one timer of said plurality of timers for each said triac type control device to be switched.

12. The control circuit of claim 7 further comprising an n-channel driver having a respective channel associated with each of said triac type control devices, said n-channel driver being serially connected between said logic means and said triac type control devices.

13. The control circuit of claim 10 further comprising multiplex circuit means connected to said logic circuit for selecting the triac type control devices to be energized.

14. The control circuit of claim 8 wherein said timer circuit and logic means are integrated in a single central processing unit.

15. The control circuit of claim 14 wherein said multiplex circuit means includes a multiplexed key set for selecting functions to be controlled by said control circuit.

16. The control circuit of claim 13 further comprising a switching pulse series timing control circuit for providing a predetermined timing advance or delay to the pulses of said switching pulse sequence to compensate for current lag or lead due to inductive or capacitive loading.

17. In apparatus including a plurality of discrete loads driven by an A.C. drive voltage switched by plural triac type control devices each having a control terminal, a low voltage control circuit for controlling the switching of the plural A.C. control devices comprising:

a pulse signal generator generating a substantially simultaneous yet relatively closely spaced sequence of non-overlapping switching pulses for switching said plural triac type control devices on one at a time by a respective switching pulse of said sequence;

a respective time delay circuit serially connected between the pulse signal generator and the control terminal of each of said plural triac type control devices, the time delay provided by each said time delay circuit associated with each said triac type control device having a different time constant, said time delay circuit supplying a said respective switching pulse to each triac type control device to be switched on, the differing time constants of said time delays causing said respective switching pulse to switch each said triac type control device at a different time to thereby distribute the switching load on said low voltage control circuit such that the peak load on said low voltage control circuit does not exceed the peak load caused by switching on a single triac type control device.

18. The control circuit of claim 17 wherein each time delay circuit includes means for generating a time delay and a threshold detector.

19. The control circuit of claim 18 wherein each said means for generating a time delay includes a resistance-capacitance timing network.

20. The apparatus of claim 17 wherein said triac type control devices comprise triacs and said plurality of discrete loads comprise a plurality of diverse type loads.

* * * * *